S. D. CASTLE.

Apparatus for Stretching Leather.

No. 6,252. Reissued Jan. 26, 1875.

Witnesses
J. H. Shumway
C. W. Forbes

Saml. D. Castle
Inventor
By atty.
J. L. Cass

UNITED STATES PATENT OFFICE.

SAMUEL D. CASTLE, OF BRIDGEPORT, CONNECTICUT.

IMPROVEMENT IN APPARATUS FOR STRETCHING LEATHER.

Specification forming part of Letters Patent No. 123,979, dated February 27, 1872; reissue No. 6,252, dated January 26, 1875; application filed November 14, 1874.

*To all whom it may concern:*

Be it known that I, SAMUEL D. CASTLE, of Bridgeport, in the county of Fairfield and State of Connecticut, have invented a new Apparatus for Stretching Leather; and I do hereby declare the following, when taken in connection with the accompanying drawings and the letters of reference marked thereon, to be a full, clear, and exact description of the same, and which said drawings constitute part of this specification, and represent, in—

Figure 1:
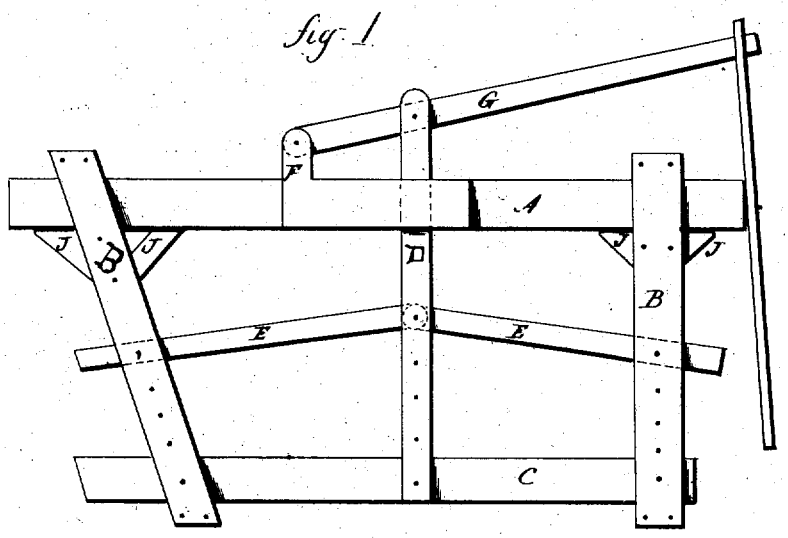
Figure 2:
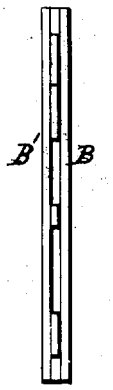

Figure 1, side view; and in Fig. 2, an end view.

This invention relates to an apparatus for stretching and drying leather either in "sides" or "whole" during the progress of manufacture, the object being to stretch a whole hide doubled on two sides of the same apparatus, and allow the free circulation of air between the two sides or between the two halves of a whole side, as the case may be.

The invention consists principally in a frame composed of two horizontal bars and two vertical bars, each made adjustable, so as to extend or contract the frame, two opposite bars working through slots in the other two, and the latter two open, so as to allow the air to circulate between the sides of leather placed upon opposite sides of the frame, as more fully hereinafter described.

A is the upper or principal bar, and is longer than the "back" line of the side to be dried or stretched. C is a similar but shorter bar, parallel to the bar A, or nearly so. B B are the two end bars, which complete the general frame. These vertical bars B B are made in two parts, B B′, as seen in Fig. 2, or so as to leave a space, slot, or opening nearly their entire length. The bars A C are each set in these slots, but so that all the bars shall be free to move—that is, so that the bars B B may be moved toward or from each other and the bar C toward or from the bar A. To thus move the bar C there is attached to that bar C a stud, D, connected to a lever, G, the fulcrum of which is on the bar A, so that by bearing down upon the lever (if it be a lever of the order shown) the bar C will be forced from the bar A, and vice versa. In order that the end pieces or bars B may be spread at the same time the bar C is moved from the bar A, a rod, E, is jointed to each of the parts B, also jointed to the stud D, the point of connection between the rods and stud, above the connection with the pieces B. Hence the two rods E form a "toggle," and, as the stud descends with the bar C, the ends B are accordingly forced asunder, and vice versa. If the stud be not thinner than the end pieces it must be slotted in similar manner to the end pieces. Angle-pieces J are introduced at the junction of the ends B with the bar A, which serve as guides to keep the end pieces in their proper relative position.

The mode of operation in using this apparatus is as follows: The upper or one edge of the side is nailed or secured to the bar A, the lower edge to the bar C, the two bars drawn sufficiently near together for the purpose, and to each of the ends B, one side to each side of the frame; then the bars are forced asunder until the requisite strain or stretching of the leather is attained and the levers secured. The two sides are thus distant from each other the thickness of the frame. The frame is then suspended by the two projecting ends of the bar A. In consequence of the slotted or open end pieces the air may circulate freely between the two sides, and thus expose both surfaces of each side to the atmosphere, and greatly facilitate the process. The parts are made adjustable, so that the frame may be used for various sizes of sides.

I do not broadly claim an expansible frame for stretching leather, as such I am aware is not new; but What I do claim as my invention is—

1. A frame for stretching leather, consisting of two parallel bars, A C, and the slotted adjustable end pieces B B, combined with mechanism for distending said frame both as to length and depth, substantially as described.

2. The combination of the open adjustable end pieces B B, the bar A, and adjustable bar C with the stud D, rods E, and a lever, all substantially as and for the purpose described.

SAMUEL D. CASTLE.

Witnesses:

JOHN E. EARLE,

C. V. FORBES.